United States Patent Office 3,329,664
Patented July 4, 1967

3,329,664
ESTERIFICATION PROCESS
Minoru Tsuda, Hiratsuka-shi, Kanagawa-ken, Japan, assignor to Agency of Industrial Science and Technology, Tokyo, Japan, a corporation of Japan
No Drawing. Filed Aug. 13, 1962, Ser. No. 216,302
Claims priority, application Japan, Aug. 18, 1961, 36/29,390; Apr. 30, 1962, 37/16,828
11 Claims. (Cl. 260—91.3)

The present invention relates to a process for esterifying high molecular weight compounds containing a plurality of hydroxyl groups, in the presence of selected solvents and alkaline water solution. The polymers are dispersed or dissolved in water or other solvents, and the resultant solution is esterified to any degree, by reaction with acid halides.

It is ordinarily difficult to esterify, in varying degrees, polymers containing polyfunctional groups. The one general process known heretofore is the esterification of polymers by acid halides in the presence of a tertiary amine, especially pyridine.

In this process, polymers suspended in a large excess of pyridine can be esterified with a desired substance by heating. However, the products are coloured and the molecular weights decreased.

In addition to long reaction time, the greatest difficulty in industrial application is the high price of the pyridine, and the difficulty of its recovery. Also, in connection with the acid halides, such substances as itaconic acid chloride and the like containing the double bond of the vinyl group react violently with pyridine. Therefore this process can not be used.

In the process of the present invention, the above difficulties are avoided. The quantity of the acid halide consumed is not changed. The pyridine, which is the great problem in the above process as the acid receptive substance, is replaced by a low cost inorganic alkali, and, as a solvent, it is replaced by water or another low cost solvent. The solvent recovery is also very easy.

In addition to these merits, the reaction product has a pure white colour and is sufficiently pure to use without refining. Furthermore the reaction time is reduced to several tens of minutes. The decreases in the molecular weight is avoided since there is no necessity for heating. In addition, this process can be used for substances sensitive to the pyridine. Another important merit in this process is that drying the polymers which are esterified is unnecessary.

In the reaction of the pyridine acid halide system, water decomposes the acid halide. Therefore it is necessary to dry the substances having the hydrophilic groups such as the hydroxyl group. This requires considerable effort.

In the reaction of the present process, the reaction is in the presence of water. Therefore such efforts are not necessary. At a glance, this seems to be inconsistent. However, this point forms one of essential features in this process. The acid halides are sensitive to water. Therefore, the esterification in alkaline water by acid halides is ordinarily difficult when the halides are not stable substances such as benzoyl chloride, paratoluene sulfonyl chloride, etc. Unless the process of the present invention is used, the esterification of polyvinyl alcohol does not proceed satisfactorily even when using these stable acid halides.

For example, in the etherification and esterification of cellulose, or the esterification of polyvinyl alcohol with acid halides and alkaline water, the prior art process results in the esterification of only a small part of hydroxyl groups contained in the polymers, because of the characteristics of polyfunctional high polymers and of the decomposition of acid halides.

Particularly in the case of polyvinyl alcohol, the polymer is esterified so locally, that the product is insoluble in any solvent. Therefore the product has no utility.

In the process of this invention, polyfunctional high polymeric substances are dispersed in molecular form. Therefore the reaction with the acid halides proceeds smoothly and the esterification also proceeds uniformly. For this reason, partially esterified polymers move from the water layer into the organic solvent layer and the esterification proceeds in the organic layer. Selected organic solvents must be used to protect the acid halide and to insure the smooth progress of the reaction.

The temperature dependence of the reactivities of acid halides is another reason for the stability of acid halides in the process of this invention. At high temperatures, the reaction between acid halides and water is promoted. The reaction between acid halides and alcoholic OH groups is not promoted by such high temperature. Therefore, in such high temperature reactions as the pyridine process, the decomposition of the acid halides by water is increased in comparison with the process of this invention, which is carried out at low temperatures.

The acid halides used in the process of this invention includes fluorides, chlorides, bromides and iodide of carboxylic acids and sulfonic acids. Alcoholic halides also may be used.

The polymers are those containing hydroxyl groups which react with acid halides; for example, polyvinyl alcohol, copolymers of vinyl alcohol and other vinyl compounds, starch, cellulose, soluble in alkaline water, and any other substances containing hydroxyl groups which can be dispersed or dissolved in water or another solvent.

The alkali material is the alkali metal and alkaline earth metal hydroxides, and their salts which are alkaline in water. However, the specific alkali used, and the conditions for its use depend upon the polymer to be esterified. For example, a water soluble high polymeric substance such as polyvinyl alcohol precipitates in concentrated alkaline solution. This leads to the failure to obtain the expected product, and a decrease in yield. Consequently the concentration of the alkaline material is limited to a predetermined range.

Sodium carbonate and potassium carbonate have a large separation effect and cannot be brought to the required concentration of the alkali. Accordingly, with the soluble high molecular weight materials, they cannot be used. The reaction of low molecular substance is different in this respect. In industrial production, in order to raise the yield of a resultant product, wherein reacting a water soluble high molecular weight substance, and of mixing it with alkaline water solution, the use of sodium hydroxide is considered to be the best for lowest cost and ease of processing.

The solvent for the acid halide is one which is insoluble in water. This serves to avoid decomposition of the acid halide due to the water. Since high molecular compounds containing the hydroxy groups will also contain a large quantity of water molecules and caustic alkali molecules, and as these high substances are almost completely insoluble in the hydrophobic organic solvent, the reaction cannot proceed smoothly, and consequently a desired esterified product is difficult to produce it when too much hydrophobic solvent is used.

In order to overcome this contradictory condition, it has been found that a solvent having some degree of water solubility may be used. A solvent meeting these criteria can be obtained by mixing a hydrophylic solvent and a hydrophobic solvent in a special ratio. The preferred solvent consists of a solvent capable of dissolving the reaction product having the specified degree of esterification and which, when stirred with water, mixes completely with the water so as to effect the reaction smoothly. However, after the reaction is completed, the solvent divides into two layers, the water layer and the solvent layer. Alkali is not included in the solvent layer. The distribution ratio of the solvent to the water is decreased if the concentration of alkili in the water is increased. It is further decreased if the concentration of the product is increased.

When it is desired to produce the product as a precipitate, a precipitant may be added thereto. The precipitate obtained in such a process is a pure white colour, and even when the raw material is more or less impure, the purity of the product is considered good.

The solvent can be recovered by evaporation, or other processing of the precipitated mother liquor.

The yield is superior owing to the low temperature. Almost complete recovery of solvent is not difficult.

The process is now described in detail. First an explanation will be given concerning water soluble high molecular weight compounds, and then concerning water insoluble high molecular weight compounds. The water soluble high molecular weight compound is assumed to be in the form of water solution of a suitable concentration and also the caustic alkali is the same as aforedescribed. When the concentration of the high molecular compound is too diluted, the reaction with the acid halide does not proceed smoothly and the yield is decreased. The concentration of the high molecular weight compound is above at least 0.01 mole/l. based on the concentration of the polyfunctional group, and should be limited within a range not separating by the addition of alkali thereto.

The concentration of the alkali is one of important criteria. In order to minimize the decomposition of the acid halide due to reaction with water, and to cause it to react only with the polyfunctional group of the high molecular weight compound, and to enable the desired degree of esterification by reaction with the acid halide, the concentration of the alkali should be at least above 0.05 mole/l.

The mole ratio of the polyfunctional group and the alkali must be between 1:1 or 1:30. The optimum ranges are the concentration of 0.3–2 mole/l. of the polyfunctional group and the concentration of 2–7 mole/l. of the alkali. The optimum polyfunctional group:alkali ratio is within ranges of 1:1.5 or 1:15. Generally, it is a reasonable matter to avoid the separation of the high molecular compound. Generally, with higher concentrations of the high molecular weight compound, the said ratio must approach 1. The reaction solution in the water layer is prepared by mixing a suitable quantity of these solutions, so as to satisfy the above ratio. In industrial production, where it is economically favorable to use a thick solution, the high molecular compound is preferably dissolved in the form of diluted state and during the violent stirring of the diluted solution, alkali solution is added thereto little by little, and thereby a clear reaction solution is prepared without accompanying the separation of the high molecular weight compound.

The acid halide is used in a quantity of 10% more than that required for the desired degree of esterification to produce the esterified high molecular compound. It is dissolved in a water-free solvent.

The concentration of the acid halide may be determined as desired and a quantity of the solvent may be determined sufficient to dissolve the esterified high molecule weight compound.

The solvent is generally formed by mixing the hydrophylic solvent and the hydrophobic solvent. Consequently it is very convenient, since the mixture may be controlled to adjust its reactivity and the solubility of the product, according to the changes in the ratio of the above solvents. The hydrophylic solvent includes tetrahydrofuran, acetone, methylcellosolve monoacetate and the like.

The hydrophobic solvent includes benzene, toluene, xylene, monochlorobenzene, methylene chloride and the like. The water solubility of methylethylketone, methylacetate, ethyl acetate and the like, is dependent upon temperature, and consequently, on occasion, its solubility may be reversed. However, generally it is preferably handled as a hydrophylic solvent. The solubility of the product is controlled by the ratio of these solvents, but not controlled by the constituents of the original solvents. For example, toluene is a poor solvent for polyvinyl cinnamic acid. However, by the addition of 10% of methylethyl ketone thereto, this may be used for the synthesis of the polyvinyl cinnamic acid. When the solvent is one that results in a low (insufficient) degree of esterification of the hydroxyl groups, the composition of the solvent may be changed to increase the degree of esterification. This may also be done when it is desired to add an additional amount of the hydrophilic solvent to promote the reaction.

As above described, the reaction is effected by stirring the mixture of the water solution prepared as above described, and the solution of the organic solvent under the selected temperature condition.

The reaction temperature varies in accordance with the type of acid halide used. The temperature must be decreased when using a solvent sensitive to water. However, when a suitable composition of the organic solvent is used, the high molecular weight compound is only partially esterified. It is then transferred into the organic solvent layer, and thereafter the esterification proceeds mainly in the solvent layer, and the water layer forms only a receptor for the hydrogen halide.

In such a case, he organic solvent layer protects the acid halide to avoid decomposition by the water.

Accordingly, the reaction temperature, if other conditions are selected properly, can be controlled over a reasonable range. For example, although a methylene chloride solution of cinnamoyl chloride is sufficiently sensitive to water to form a white smoke in the air, a change of the reaction temperature from −10° C. to 25° C. in the synthesis of polyvinyl cinnamic acid, causes the yield to change only plus or minus 10%. However, if a proper balance between the selection of the organic solvent, the cencentration of the high molecular weight compound to be esterified, and the concentration of alkali is not made, it is found that the solvent is sensitive to the temperature.

As is apparent from the above explanation, a high molecular weight compound having hydroxyl groups does not necessarily have to be water soluble.

For example, when a copolymer of vinyl acetate-vinyl alcohol (including about 50% of the acetyl group) is dissolved in a mixed solvent of methylethyl ketone and toluene, the said mixed solvent will effect esterification by stirring and mixing wih an alkali water solution which contains the acid halide. In the case of a copolymer of styrene-vinyl alcohol, and of a copolymer of ethylene vinyl alcohol, and the like, water solubility is decreased as the content of styrene or ethylene is raised. However, the esterification can be effected in the same way. These react in the same manner as the latter half of the esterification reaction of water soluble high molecular weight compounds.

Accordingly, in the following explanation, this point is not discussed further. One of the bases for novelty of the reaction conditions described in detail is that the substances to be esterified consist of high molecular weight compounds containing polyfunctional groups. In the case of one or more of polyfunctional groups (OH groups), the fully esterified ones and the partially esterified ones are simply separated from each other and are purified.

Even when the process conditions are not properly determined, the yield is only reduced and the quality of a product is not entirely affected. However, the esterification of polyfunctional high molecular weight compounds, for instance, polyvinyl alcohol including OH groups of an average number of 2,000, cannot be accomplished to obtain an object having a desired quality unless under proper conditions. However, as in the present reaction, when a substance containing the OH group of water and caustic sodium are present in the first stage at a concentration of 116 times (see Example 1) and in the final stage an infinite concentration, the esterification reaction proceeds with considerable difficulty. Heretofore, in the caboxymethylation of cellulose known as a similar reaction, the degree of etherification is about 30%, maximum. In the esterification of reactive dyes, developed recently, the degree of esterification is below 1%. In brief, heretofore, it can be said that the esterification using alkali, has only been effected with low esterification yields in the past. One of its causes is the relative rate of reactivity due to the kind of alcoholic OH group present. Generally, the secondary alcohol has a reactivity of ½–⅓ order of the first alcohol. Accordingly, in the case of cellulose, the major portion of OH groups etherified or esterified is assumed by the first alcohol corresponding to ⅓ of all the OH groups.

However, when using the conditions described in the present specification, esterification approaching the order of 100% of polyvinyl alcohol including the secondary alcohols can be effected by the use of only 10% excess of acyl halide. This is true when using cinnamoyl chloride which is sensitive to water.

In accordance with the present invention, the esterification of various high molecular compounds is made easy and made applicable on a large scale. The synthesis of sensitizing solution for photomechanical process can be mentioned as one example. When polyvinyl alcohol or a substance including acetyl groups of 10–20% order is esterified by means of cinnamic acid, a high molecular weight compound having photosensitive properties is obtained. This compound is dissolved in a suitable solvent together with a sensitizer and this solution is used as sensitizing solution. This sensitizing solution has benefits including the sharpness of image produced by exposure; the simplicity of its use without special technics; the toughness of film produced and various other advantages, and at the same time, the defects in the prior use of bichromated gelatin, bichromated polyvinyl alcohol, bichromated shellac and the like are fully removed. However, the prior synthesis process depends on the use of pyridine and the manufacturing cost thereof is considerably raised so that its use has been limited mainly because of cost. In accordance with the present invention, it is not necessary to use pyridine of high price and in addition to this, the solution produced in the reaction mixture may be used as a sensitizing solution as it stands, so that the manufacturing cost is decreased by a large margin and the marketing price of the solution can be lowered to the same order as that of bichromated gelatin.

Accordingly, the sensitizing solution produced according to the process of the present invention because of its properties is in great demand for photomechanical processes for printing, or in the production of photomechanical products forming parts for electronic instruments or precision machines.

The following are detailed individual examples of the present invention.

EXAMPLE 1

While stirring a 100 cc. water solution of polyvinyl alcohol dissolved to have the concentration of 1 mole/l. referring to hydroxyl group, 100 cc. of water solution of 4 mole/l. caustic sodium is added and mixed therewith. After mixing to obtain a clear solution, 100 cc. of methyl ethyl ketone is added to the solution. Specifically, 1.1 molecular equivalent of cinnamoyl chloride relative to hydroxyl group of polyvinyl alcohol is taken and is dissolved into the mixing solvent of 116 cc. of methyl ethyl ketone and of 24 cc. of toluene. After cooling both solutions to 1° C., the solutions are mixed, and while maintaining the mixed solution at the temperature of 0–5° C., is stirred for 60–90 minutes so as to cause the reaction. After the stirring is stopped, when the solution is not agitated at the room temperature, the solution divides naturally into two layers. The upper layer of the solution is removed; 100 g. of methyl-cellosolve monoacetate containing 1.5 g. of paranitrodiphenyl is added, to form a sensitizer.

The resultant solution can be used as a sensitizing solution. The resistance of this sensitizing solution to nitric acid is superior to that obtained by the synthesis with pyridine. The yield of polyvinyl cinnamic acid is substantially theoretical. Even though the polymerization degree of polyvinyl alcohol is changed from 500 to 2,000, similar results are obtained.

EXAMPLE 2

In this example, instead of polyvinyl alcohol as in Example 1, the partial saponification product of several polyvinyl acetates containing 1.5–2.0 mole percent of acetyl group has been used. In this case, a substantially theoretical yield has been obtained.

EXAMPLE 3

In this example, instead of polyvinyl alcohol as in Example 1, a water soluble polymer of ethylene-vinyl alcohol has been used. The yield in this example has been a substantially theoretical amount.

EXAMPLE 4

Instead of polyvinyl alcohol in Example 1, starch has been used. This starch has been dissolved to have concentration of 1 mole/l. of hydroxyl group.

EXAMPLE 5

A copolymer of vinyl acetate-vinyl alcohol which has been produced by dissolving 50 mole percent acetate into 140 cc. of methyl ethyl ketone including 10% toluene in 0.5 mole/l. concentration relative to OH group. Cinnamoyl chloride dissolved in 100 cc. of the same solvent at the ratio of 11 molecular equivalent relative to vinylalcohol, was then mixed with the former solution. The resultant solution has been cooled to the temperature of $-1°$ C., and 4 mole/l. caustic sodium water solution at the same temperature added. The reaction mixture was stirred at a temperature of 0–5° C. for 60 minutes so as to cause the reaction. After the stirring has been finished, the solution was left at room temperature. The solution divided naturally into two layers. To the upper layer of the solution, 200 cc. of petroleum ether was added so as to precipitate a resin. The yield was substantially theoretical amounts.

EXAMPLE 6

Instead of caustic sodium as in Example 1, caustic potassium has been used. The same yield has been obtained.

EXAMPLE 7

Instead of a solvent of toluene-methyl ethyl ketone mixture, a solvent mixed in the proportion of 3 tetrahydrofuran and 7 of xylene has been used. In this case, the same yield as that in the former example has been obtained.

EXAMPLE 8

The quantity of chloride has been changed from 0.7 to 1.1 molecular equivalent. The yield has been substantially theoretical quantity and the degree of esterification has been confirmed that it may be adjusted by a quantity of the chloride.

EXAMPLE 9

Instead of cinnamoyl chloride as in Example 1, acrylic chloride has been used: In this case, the water solution had been cooled to a temperature of $-10°$ C. The organic solvent had been cooled to a temperature of $-20°$ C. The yield was 50% and acrylyl chloride has been obtained. This resin was very easily dissolved in acetone.

What is claimed is:

1. A process for esterifying polyhydroxy-containing organic polymers comprising reacting an acyl halide with said polymer, at a low temperature, in a reaction system comprising
   (i) a hydrophobic solvent,
   (ii) a hydrophilic organic solvent, and
   (iii) an alkaline aqueous solution containing at least one inorganic alkaline material selected from the group consisting of alkali metal and alkaline earth metal hydroxides.

2. A process for esterifying polyhydroxy-containing organic polymers comprising reacting an acyl halide with said polymer in a reaction system at a temperature between $-10°$ and $25°$ C. comprising
   (i) at least one hydrophobic organic solvent,
   (ii) at least one hydrophilic organic solvent, and
   (iii) an alkaline aqueous solution containing at least one caustic selected from the group consisting of alkali metal and alkaline earth metal hydroxide in an amount in excess of 0.05 mole per liter, the mole ratio of the hydroxyl groups on said polymer, and the caustic being between 1:1 and 1:30.

3. The process of claim 2 wherein the caustic is between 2 and 7 moles per liter.

4. The process of claim 3 wherein said organic polymers are selected from the group consisting of polyvinyl alcohol, partially saponified polyvinyl acetate, water soluble polymer of ethylene-vinyl alcohol, starch, and a copolymer of vinyl acetate-vinyl alcohol.

5. The process of claim 4 where said hydrophobic solvent is selected from the group consisting of benzene, toluene, xylene, monochlorobenzene, and methylene chloride, and said hydrophilic solvent is selected from the group consisting of tetrahydrofuran, acetone, methyl Cellosolve monoacetate, methyl acetate, ethyl acetate, and methylethyl ketone.

6. The process of claim 5 wherein said caustic is sodium hydroxide.

7. The process of claim 5 wherein said caustic is potassium hydroxide.

8. The process of claim 5 wherein said polymer is polyvinyl alcohol.

9. The process of claim 5 wherein said acyl chloride is selected from the group consisting of cinnamoyl chloride and acrylyl chloride.

10. The process for esterifying polyvinyl alcohol comprising reacting said polyvinyl alcohol with cinnamoyl chloride in a reaction system comprising methylethyl ketone, toluene, and an aqueous solution containing between 2 and 7 moles per liter of sodium hydroxide, at a temperature between about $-10°$ and $25°$ C.

11. The process for esterifying a copolymer of vinyl acetate-vinyl alcohol comprising reacting said vinyl acetate-vinyl alcohol with cinnamoyl chloride in a reaction system comprising methylethyl ketone, toluene, and an aqueous solution containing between 2 and 7 moles per liter of sodium hydroxide, at a temperature between about $-10°$ and $25°$ C.

References Cited

UNITED STATES PATENTS

| | | | |
|---|---|---|---|
| 2,169,250 | 8/1939 | Izard | 260—91.3 |
| 2,379,309 | 5/1945 | Malm et al. | 260—91.3 |
| 2,420,720 | 5/1947 | Pechukas et al. | 260—91.3 |
| 2,725,372 | 11/1955 | Minsk | 260—91.3 |
| 3,033,842 | 5/1962 | Holtschmidt | 260—91.3 |

OTHER REFERENCES

Bruhl, Berichte, vol. 36, #720, pp. 4272–3 (1903).

Menalda, Recueil des Travaux Chimique, des Pays-Bas, vol. 49, p. 973 (1930).

Reasenberg et al., Journal of the American Chemical Society, vol. 67, pp. 933–9 (1945).

JOSEPH L. SCHOFER, *Primary Examiner.*

LOUISE P. QUAST, *Examiner.*

M. L. BERCH, J. A. DONAHUE, *Assistant Examiners.*